June 4, 1968  D. McINTYRE  3,386,274
TRAILER LOCK
Filed June 16, 1967  2 Sheets-Sheet 2

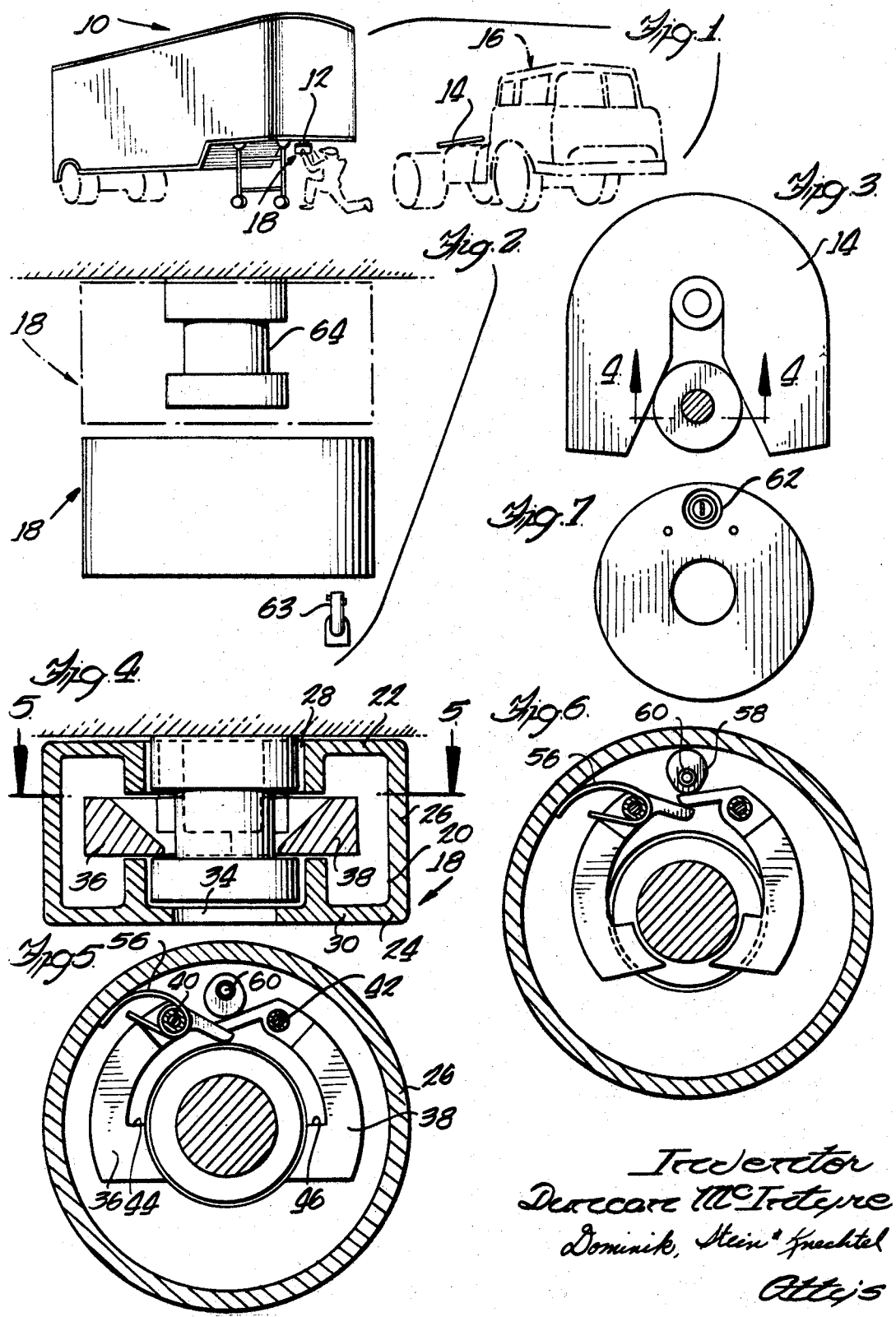

Inventor
Duncan McIntyre
Dominik, Stein & Knechtel
Atty's

United States Patent Office 3,386,274
Patented June 4, 1968

3,386,274
TRAILER LOCK
Duncan McIntyre, Chicago, Ill., assignor of one-half to Samuel Kurland and Ann Kurland, Skokie, Ill., joint tenants
Filed June 16, 1967, Ser. No. 646,680
6 Claims. (Cl. 70—232)

ABSTRACT OF THE DISCLOSURE

A trailer lock having a generally cylindrical shaped housing, with a flat plate at the top and the bottom and an aperture extending through it which is adapted to receive the coupling pin of a trailer. A pair of jaw elements are pivotally secured within the housing in spaced relation and normally biased to lockingly engage the coupling pin of the trailer. The jaw elements each have an extension which overlaps one another, and a cam member operated by a lock mechanism cammingly engages one of the extensions to pivotally move the two jaw elements to an open, unlocked position to permit the locking means to be removed from the trailer's coupling pin.

---

This invention relates to a locking means which is operable for prevention of highjacking a parked trailer by coupling a tractor thereto.

In the trucking industry, which has assumed a role of increasing importance in the transportation, or carrier industry, it is common practice to park a trailer and remove the tractor, or cab, for use otherwise. Such parked and unattended trailers may be easily highjacked, that is, a truck is surreptitiously coupled to such a trailer and driven away to a place where the thief can unload the trailer and dispose or otherwise make profit of the contents.

In U.S. Patent 3,112,636, there is disclosed a locking means which may be removably affixed to the coupling pin of a trailer which makes it impossible to couple any tractor to the trailer. In such manner, the danger of highjacking a parked and unattended trailer, by coupling a tractor thereto and driving the trailer away, is eliminated.

The subject locking means includes, generally, a pair of jaw elements which are pivoted together about the coupling pin of the trailer and adapted to be locked about the coupling pin by means of a padlock extended through apertures in both jaw elements. The locking means is extremely effective in preventing highjacking of a trailer, however, it is not impossible to cut the padlock from the jaw elements with proper tools, thereby rendering the locking means uneffective.

Accordingly, it is an object of the present invention to provide improved locking means of the described type.

Another object is to provide improved locking means of the described type having jaw elements which are operable to both open and lock them by means of an internally concealed lock mechanism.

A further object is to provide improved locking means of the described type which are adapted to be snap-actingly positioned and locked on the coupling pin of a trailer.

Still another object is to provide improved locking means of the described type having jaw elements which automatically open to release the coupling pin of the trailer when the lock mechanism is operated to unlock the same.

A still further object is to provide an improved locking means of the described type having jaw elements having a double pivotal action.

Other objects of the invention will in part be obvious and will in part appear hereinafter.

The above objectives are accomplished with a trailer lock having a generally cylindrical shaped housing, with a flat plate at the top and the bottom and an aperture extending through it which is adapted to receive the coupling pin of a trailer. A pair of jaw elements are pivotally secured within the housing in spaced relation and normally biased to lockingly engage the coupling pin of the trailer. The jaw elements each have an extension which overlaps one another, and a cam member operated by a lock mechanism cammingly engages one of the extensions to pivotally move the two jaw elements to an open, unlock position to permit the locking means to be removed from the trailer's coupling pin.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of a trailer and a tractor, illustrating the manner in which the trailer lock is affixed to the coupling pin of the trailer;

FIG. 2 is an enlarged plan view of the trailer coupling pin and the trailer lock generally illustrating the manner in which the locking means is affixed to the coupling pin;

FIG. 3 is a plan view illustrating the trailer lock affixed to the trailer coupling pin and further illustrating the manner in which the trailer lock prevents a tractor from being coupled to the trailer;

FIG. 4 is a sectional view taken along lines 4—4 of FIG. 3;

FIG. 5 is a sectional view, taken along lines 5—5 of FIG. 4, illustrating the jaw elements of the trailer lock in an opened position;

FIG. 6 is a sectional view like FIG. 5, however, illustrating the jaw elements in a closed, locked position;

FIG. 7 is a bottom planned view of the trailer lock; and

Similar reference characters refer to similar parts throughout the several views of the drawings.

Figure 8:
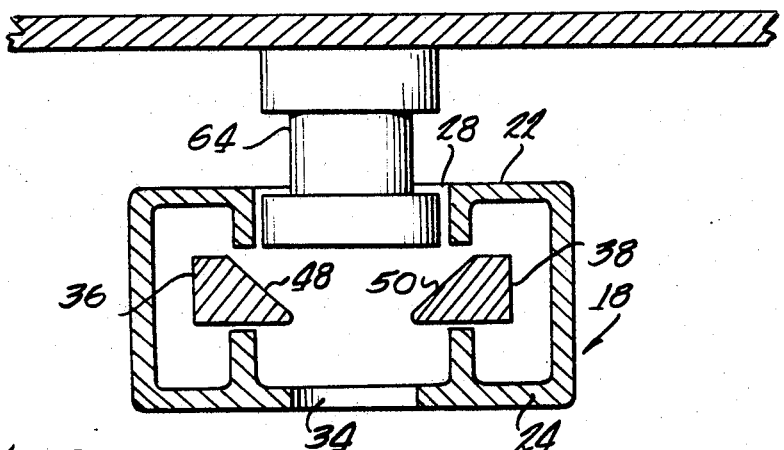
FIGS. 8 and 9 are transverse sectional views of the trailer lock, generally illustrating the manner in which the trailer lock is cammingly and snap-actingly lockingly engaged with a trailer couping pin.

Referring now to the drawing, in FIG. 1 there is shown a trailer 10 having a coupling pin 12 which is adapted to be engaged by and secured to a coupling platform 14 affixed to a tractor 16, for transporting the trailer 10 by the tractor. The manner in which the trailer 10 is coupled to the tractor 16 by means of the coupling platform 14 is in the well-known manner and forms no part of the present invention.

As indicated above, it is common practice to park a trailer and remove the tractor, or cab, for use otherwise. Highjacking of the trailer can be prevented by removably affixing a trailer lock 18, described fully below, to the coupling pin 12 of the trailer. The trailer lock 18 prevents the coupling platform of a truck from being affixed to the coupling pin of a trailer, in the manner described more fully below.

The trailer lock 18 includes a housing 20 which in the illustrated example is cylindrical in shape having a top wall 22 and a bottom wall 24 which is fixed in parallel spaced relation to the top wall by a peripheral side wall 26. The top wall 22 has a coupling pin aperture 28 in it which opens into a jaw element cavity 30 formed between the top and bottom walls 22 and 24. A coupling pin cavity 32 is formed in the bottom wall 24, in axial alignment with the coupling pin aperture 28. A reduced diameter aperture 34, in axial alignment with the coupling pin cavity 32, also is formed in the bottom wall 24.

The jaw element cavity 30 is of substantial size and has two jaw elements 36 and 38 pivotaly affixed therein to lockingly clamp about a trailer coupling pin, in the manner described more fully below. The jaw elements 36 and 38, as can be best seen in FIGS. 5 and 6, are generally arcuate in shape and are pivotally affixed within the jaw element cavity 30 by means of spaced-apart pivot pins 40 and 42, respectively. Each of the jaw elements 36 and 38 has an integral arcuate locking projection 44 and 46 formed on the free-swing ends thereof, respectively, which are positioned to project towards the other. Tapered edges 48 and 50 are formed on respective ones of the jaw elements, as can be best seen in FIGS. 8 and 9, and permit the jaw elements 36 and 38 to be snap-actingly and lockingly engaged about a trailer coupling pin when the trailer lock is forcibly urged onto the coupling pin, as explained more fully below.

The jaw elements 36 and 38 also have finger-like cam extensions 52 and 54 on the other ends thereof, respectively, on the opposite sides of the pivot pins 40 and 42. These cam extensions 52 and 54 are positioned adjacent one another so that the cam extension 54 cams against the cam extension 52 to cause the jaw element 36 to pivot to an open, unlock position. When the cam element 54 is moved in such a fashion, the jaw element 38 is, of course, likewise pivoted to an open unlock position. Correspondingly, when the cam extension 52 is caused to cam against the cam extension 54, the jaw elements are caused to pivot to a closed, locked position.

Biasing means which can be in the form of a resilient spring 56 is affixed to the jaw element 36 and normally biases the jaw element 36 so that its cam extension 52 cams against the cam extension 54 to thereby normally bias both the jaw elements 36 and 38 in the closed, locked position.

A cam 58 is eccentrically affixed to a shaft 60 of a key-operated lock mechanism 62 (FIG. 7) and is positioned to cammingly engage against the cam extension 54, when the lock mechanism 62 is operated by a key 63. The cam 58, in turn, causes the cam extension 54 to cam against the cam extension 52. This action causes both of the jaw elements to pivot to open, unlocked position.

Figure 9:
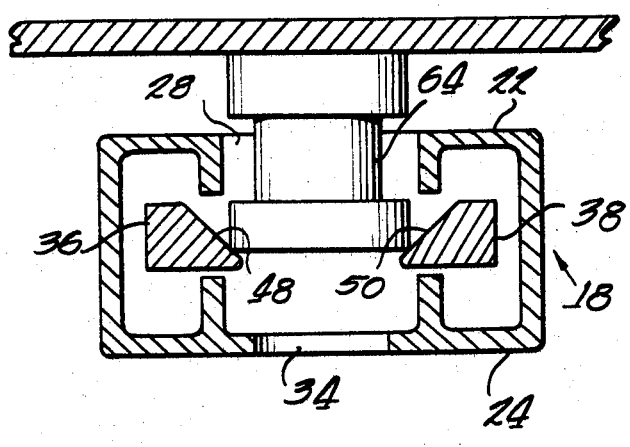

To affix the trailer lock 18 to a trailer coupling pin, such as the coupling pin 12, the trailer lock is forcibly urged upwardly to extend the coupling pin through the coupling pin aperture 28 and in engagement with the tapered edges 48 and 50 of the jaw elements 36 and 38, as can be best seen in FIGS. 8 and 9. Continued upward force will cause the jaw elements 36 and 38 to pivot outwardly to the open, unlocked position, by the combined action of the coupling pin 12 bearing on the tapered edges 48 and 50 and the cam extension 52 camming against the cam extension 54.

The coupling pin 12 has a reduced diameter annular lock groove 64 (FIG. 2) in its peripheral surface, and the jaw elements 36 and 38 snap-actingly engage and lock within the lock groove 64, when the trailer lock 18 is properly positioned on the coupling pin 12. Once the locking projections 44 and 46 on the jaw elements 36 and 38 seat within the lock groove 64, the trailer lock 18 is fixedly locked to the coupling pin 12 and cannot be removed unless the locking mechanism 62 is operated by means of the key 63.

As can be best seen in FIG. 3, when the trailer lock 18 is affixed to the trailer coupling pin 12, it is impossible to couplingly engage it with the coupling platform 14 of the truck 16.

To remove the locking means 18, the key 63 is inserted in the locking mechanism 62 and the latter operated to turn the cam 58. The cam 58, upon being rotated, cammingly engages against the cam extension 54, thereby causing the jaw element 38 to pivot about the pivot pin 42 to the open, unlock position. The cam extension 54 simultaneously cammingly engages the cam extension 52 to cause the jaw element 36 to pivot about the pivot pin 40 to the open, unlock position. With the jaw elements 36 and 38 both in the open, unlock position, the trailer lock 18 is easily removed from the coupling pin 12, by merely lowering it off of the coupling pin 12.

It can be seen from the above description of the trailer 18 that it is easily and quickly both affixed to and removed from a trailer coupling pin. Also, the housing 20 preferably is cast of cast iron as an integral structure and the jaw elements 36 and 38 which also are cast of cast iron thereafter are pivotally affixed therein. The locking mechanism 62 including the cam 58 next is affixed therein. The construction of the locking means is therefore also relatively simple so that it can be both inexpensively manufactured and assembled.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A locking means for a trailer having a coupling pin comprising a housing arranged to surround the trailer coupling pin, a locking mechanism, and movable jaw elements pivotally supported in the housing and arranged to lockingly engage with said trailer coupling pin to maintain the housing in position on the trailer coupling pin, said jaw elements each having an extension which cammingly engages one another to lockingly engage and to release said jaw elements with said trailer coupling pin, said jaw elements being normally biased to lockingly engage said jaw elements with said trailer coupling pin and operated in response to the operation of said locking mechanism to lockingly disengage with said trailer coupling pin.

2. The locking means of claim 1, wherein said jaw elements each is affixed to one of a pair of spaced-apart pivot pins supported in said housing, said extension on said jaw elements extending beyond said pivot pins and cammingly engaging one another.

3. The locking means of claim 1, wherein said locking mechanism is key operated and comprises an eccentrically affixed cam member positionally supported within said housing to cam against at least one of said extensions on said jaw elements, said cam member upon being operated causing said extensions to cammingly engage one another so as to pivot said jaw elements to lockingly disengage said jaw elements with said trailer coupling pin.

4. The locking means of claim 3, further including spring means affixed to at least one of said jaw elements normally biasing said jaw element to lockingly engage with said trailer coupling pin, said extension on said biased jaw element cammingly engaging the extension on the other one of said jaw elements to lockingly engage it with said trailer coupling pin, said cam member when operated pivoting said jaw element to lockingly disengage from said trailer coupling pin, whereby the locking means is removable from the trailer coupling pin only when its locking mechanism is operated with a key.

5. The locking means of claim 1 wherein said housing includes a top wall and a bottom wall in spaced relation and a peripheral side wall, an aperture in said top wall having a diameter greater than the external diameter of said trailer coupling pin, said jaw elements having arcuate projections which are extendable when said jaw elements are in the closed lock position to lockingly engage a trailer coupling pin.

6. The locking means of claim 1, wherein each of said jaw elements has a tapered edge which is cammingly engagable by a trailer coupling pin to forcibly urge them toward the open, unlock position, whereby a coupling pin can be forcibly urged between the jaw elements, said jaw elements snap-actingly lockingly engaging with said coupling pin when said locking means is properly positioned on said coupling pin.

References Cited

UNITED STATES PATENTS

| | | | |
|---|---|---|---|
| 2,706,392 | 4/1955 | Lucas et al. | 70—232 |
| 3,112,636 | 12/1963 | McIntyre | 70—232 |

MARVIN A. CHAMPION, *Primary Examiner.*

R. L. WOLFE, *Assistant Examiner.*